Patented Apr. 19, 1932

1,854,894

UNITED STATES PATENT OFFICE

FRIEDRICH FELIX AND FRITZ STRAUB, OF BASEL, SWITZERLAND, ASSIGNORS TO SOCIETY OF CHEMICAL INDUSTRY IN BASLE, OF BASEL, SWITZERLAND

AZO-DYESTUFFS AND PROCESS OF MAKING SAME

No Drawing. Application filed October 3, 1929, Serial No. 397,146, and in Switzerland October 8, 1928.

The present invention relates to the manufacture of new azo-dyestuffs. It comprises the process of making these dyestuffs, the dyestuffs themselves, as well as the material dyed with the new products.

It has been found that new dyestuffs are obtained by coupling compounds of the general formula

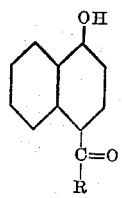

wherein R means alkyl or alkoxy, with a diazo-compound.

According to the diazo-compound selected there are obtained dyestuffs of the general formula

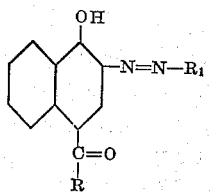

wherein R signifies alkyl or alkoxy, and $R_1$ any aromatic complex, which may be used as acid dyestuffs, as mordant dyestuffs, as lake dyestuffs, and as cotton dyestuffs, or as dyestuffs for colloids of the cellulose series, such as acetate silk or Zapon varnish. The products of the coupling can further be converted into dyestuffs containing metal by treatment with agents that yield metal, such as copper compounds or chromium compounds; these derivatives also possess valuable dyeing properties.

The following examples illustrate the invention, the parts being by weight:—

Example 1

93 parts of aniline are diazotized as usual and the diazo-solution is stirred at 0° C. into a solution of 224 parts of the sodium compound of 1:4-naphtholcarboxylic acid methyl ester containing 160 parts of sodium carbonate or a solution of 208 parts of the sodium compound of 1-hydroxynaphthalene-4-methylketone containing 160 parts of sodium carbonate. The dyestuff which separates, corresponding with the general formula

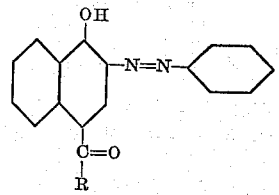

wherein R stands for $CH_3$ or $OCH_3$, is stirred for 1 hour, then filtered and washed until neutral. It is a red powder which dissolves in concentrated sulfuric acid to a pure red solution.

The dyestuff from 1:4-naphtholcarboxylic acid ethyl ester shows similar properties.

These dyestuffs dye acetyl-cellulose, acetate silk or cellulose varnish, such as Zapon varnish, red orange tints of a remarkable purity and fastness. The corresponding dyestuffs from diazo-paranitrobenzene dye the Zapon varnishes red tints very fast to light.

Example 2

A diazo-solution produced by diazotizing 150 parts of monoacetyl-para-phenylenediamine is introduced, while stirring, at 0° C. into a solution of the sodium compound prepared from 202 parts of 1:4-naphtholcarboxylic acid methyl ester or from 186 parts of 1-hydroxynaphthalene-4-methylketone containing 160 parts of sodium carbonate. The dyestuff, corresponding with the general formula

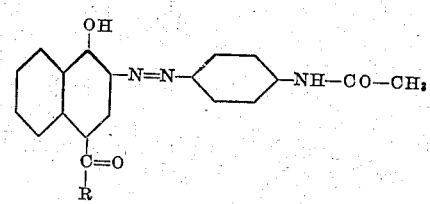

wherein R stands for $CH_3$ or $OCH_3$, is filtered and washed until neutral. It is a dark red powder which dissolves in concentrated sulfuric acid to a bluish-red solution. It dyes colloids of the cellulose series bluish-red tints.

Example 3

A solution of the sodium compound prepared from 202 parts of 1:4-naphtholcarboxylic acid methyl ester or from 186 parts of 1-hydroxynaphthalene-4-methylketone containing 160 parts of sodium carbonate is mixed, at 0° C., while stirring, with a diazosolution obtained by diazotizing 123 parts of meta-aminobenzylalcohol. The precipitated dyestuff, corresponding with the general formula

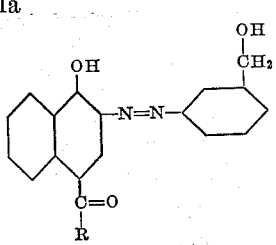

wherein R stands for $CH_3$ or $OCH_3$, is worked up as described in Example 1. It is a red powder which dissolves in concentrated sulfuric acid to a red solution. The new dyestuff is characterized by pronounced affinity for acetate silk and dyes this fiber a red orange tint.

Example 4

Into a solution of 1:4-naphtholcarboxylic acid methyl ester or 1-hydroxynaphthalene-4-methylketone containing sodium carbonate and prepared as described in Example 1, there is introduced, while stirring, the diazocompound from 173 parts of sulfanilic acid. The dyestuff which forms quickly, and which corresponds with the general formula

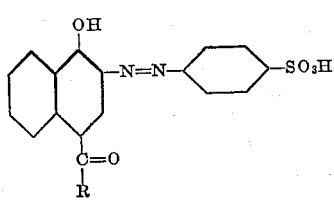

wherein R stands for $CH_3$ or $OCH_3$, is completely precipitated by the addition of common salt, filtered and dried. It is a red powder, soluble in water to an orange solution and yielding when printed on acetate silk a pure red-orange which does not sublime. Wool is dyed by it in an acid bath red-orange.

Dyestuffs which dye cotton or artificial silk from regenerated cellulose, such as viscose silk or cuprammonium silk, are obtained by substituting dehydrothiotoluidine sulfonic acids for the sulfanilic acid.

Example 5

223 parts of 1-hydroxy-6-amino-4-chlorobenzene-2-sulfonic acid are diazotized as usual and the diazo-solution is coupled with a solution prepared as described in Example 1 of 202 parts of 1:4-naphtholcarboxylic acid methyl ester. After stirring for several hours, the dyestuff thus formed, corresponding with the formula

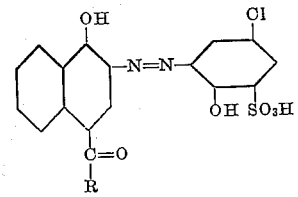

wherein R stands for $CH_3$, is filtered, washed with common salt solution and dried. It is a violet powder, soluble in water to a violet solution, dyeing wool in an acid bath red, and yielding violet tints of excellent fastness properties when after-chromed. By treatment with agents yielding copper it is converted into a complex copper compound which dyes wool red and by treatment with an agent yielding chromium it yields a complex compound which dyes wool violet. The formula of this complex metal compound is not known.

Quite a similar dyestuff is obtained with the 1-hydroxynaphthalene-4-methylketone or with the 2-amino-1-phenol-4-chloro-6-sulfonic acid. Further dyestuffs which can be after-chromed are obtained from o-aminophenol-disulfonic acids or from the nitroaminophenol sulfonic acids.

The dyestuff from diazotized 1-amino-2-hydroxynaphthalene-4-sulfonic acid yields fast reddish-blue tints when after-chromed on wool.

Example 6

224 parts of 2-aminonaphthalene-1-sulfonic acid are diazotized and coupled with a solution of 209 parts of the methyl ester of 1-hydroxynaphthalene-4-carboxylic acid. The precipitated dyestuff is filtered, washed with water and dried. It is a red powder which dissolves in much boiling water to a pure red solution. Its barium lake is intensely red.

What we claim is:—

1. A manufacture of azo-dyestuffs consisting in coupling a compound of the general formula

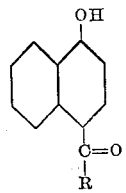

wherein R stands for alkyl or alkoxy, with diazo-compounds of the benzene and naphthalene series.

2. A manufacture of azo-dyestuffs consisting in coupling a compound of the general formula

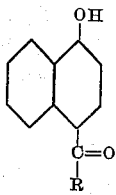

wherein R stands for alkyl or alkoxy, with o-hydroxy-diazo-compounds of the benzene and naphthalene series.

3. A manufacture of azo-dyestuffs consisting in coupling a compound of the general formula

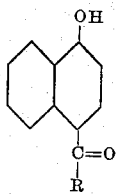

wherein R stands for alkyl or alkoxy, with a o-diazo-phenol sulfonic acids.

4. A manufacture of azo-dyestuffs consisting in coupling a compound of the general formula

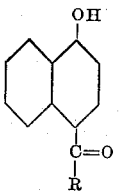

wherein R stands for alkyl or alkoxy, with o-diazo-chloro-phenol sulfonic acids.

5. As new articles of manufacture the dyestuffs of the general formula

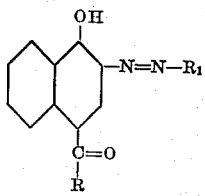

wherein R stands for alkyl or alkoxy, and $R_1$ for the aromatic radicle of any diazo compound of the benzene and naphthalene series.

6. As new articles of manufacture the dyestuffs of the general formula

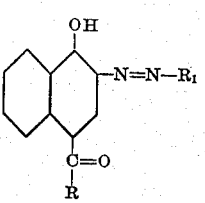

wherein R stands for alkyl or alkoxy, and $R_1$ for an aromatic radicle of the benzene and naphthalene series containing at least one sulfo-group, which products dissolve in water to red-orange to blue solutions, dyeing the fiber similar tints.

7. As new articles of manufacture the dyestuffs of the general formula

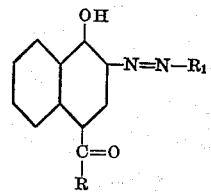

wherein R stands for alkyl or alkoxy, and $R_1$ for a radicle of a sulfonated o-hydroxy-diazo-compound of the benzene and naphthalene series, which products dissolve in water to red to blue solutions, dyeing wool with aid of chromium mordants fast brown-violet to violet and blue tints.

8. As new articles of manufacture the dyestuffs of the general formula

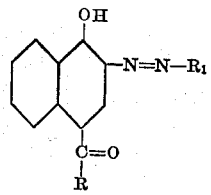

wherein R stands for alkyl or alkoxy, and $R_1$ for a radicle of a sulfonated o-hydroxy-diazo-compound of the benzene series, which products dissolve in water to red to blue solutions, dyeing wool with aid of chromium mordants fast brown-violet to violet and blue tints.

9. As new articles of manufacture the dyestuffs of the general formula

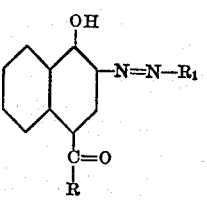

wherein R stands for alkyl or alkoxy, and $R_1$ for a radicle of an o-hydroxy-diazo-chlorophenol sulfonic acid, which products form violet powders, dissolving in water to violet solutions, and dyeing wool with aid of chromium mordants fast violet tints.

In witness whereof we have hereunto signed our names this 23rd day of September, 1929.

FRIEDRICH FELIX.
FRITZ STRAUB.